(12) United States Patent
Camiel

(10) Patent No.: US 7,490,199 B2
(45) Date of Patent: Feb. 10, 2009

(54) SYSTEM AND METHOD FOR SAFE REMOVAL OF A REMOVABLE DEVICE FROM A DIGITAL APPLIANCE

(76) Inventor: Noam Camiel, 47 Bilu St., Apt 4, Tel-Aviv (IL) 64256

( * ) Notice: Subject to any disclaimer, the term of this patent is extended or adjusted under 35 U.S.C. 154(b) by 214 days.

(21) Appl. No.: 11/429,191

(22) Filed: May 8, 2006

(65) Prior Publication Data

US 2006/0250741 A1 Nov. 9, 2006

Related U.S. Application Data (60) Provisional application No. 60/679,076, filed on May 9, 2005.

(51) Int. Cl.
*G06F 12/00* (2006.01)
(52) U.S. Cl. .......... 711/115; 711/4; 711/100; 711/102; 711/103; 711/113; 711/114; 711/135; 711/143; 711/115; 710/100; 710/301; 710/302
(58) Field of Classification Search .......... 711/4, 711/100, 102–103, 113–115, 135–136, 143; 710/100, 301–302
See application file for complete search history.

(56) References Cited

U.S. PATENT DOCUMENTS

| | | | | |
|---|---|---|---|---|
| 4,940,969 A * | 7/1990 | Taylor | ......... | 340/653 |
| 5,617,018 A * | 4/1997 | Earle | ......... | 324/72.5 |
| 5,701,492 A * | 12/1997 | Wadsworth et al. | ......... | 717/173 |
| 6,189,050 B1 * | 2/2001 | Sakarda | ......... | 710/18 |
| 7,234,014 B2 * | 6/2007 | Molander et al. | ......... | 710/302 |
| 7,277,011 B2 * | 10/2007 | Estakhri | ......... | 340/540 |
| 2003/0023410 A1 * | 1/2003 | Roth | ......... | 702/188 |

* cited by examiner

*Primary Examiner*—Stephen C Elmore
*Assistant Examiner*—Zhuo H Li (57) ABSTRACT

A method and system is introduced for allowing removal of a removable device connected to a digital appliance in a safe manner that preserves removable device integrity. There is no requirement for taking any actions prior to removing the removable device such as to safely remove the device. The user can intuitively tell removable device is in a state that can be safely removed and remove the device. Following a state where device can be safely removed, digital appliance can make use of removable device if the removable device had not been removed from the digital appliance.

14 Claims, 5 Drawing Sheets

SYSTEM AND METHOD FOR SAFE REMOVAL OF A REMOVABLE DEVICE FROM A DIGITAL APPLIANCE

CROSS-REFERENCE TO RELATED APPLICATIONS

This application claims the benefit of U.S. Provisional Patent Ser. No. 60/679,076, filed May 9, 2005 by the present inventor.

FIELD OF INVENTION

This invention generally relates to devices that can attach to a computational device and that may be removed from the computational device. More particularly this invention relates to removal of removable devices from a computation device.

BACKGROUND OF THE INVENTION

The use of digital devices that can be dynamically attached and removed from a computational device has been growing rapidly. Such devices will be referred herein as removable devices. The USB standard for example has enabled numerous devices to be dynamically connected and removed from a computational device even during the operation of the computational device.

Among these removable devices are mass storage devices such as flash drives, and multimedia players. These devices can be attached to a computational device referred herein as digital appliance and then later be removed. It is of great concern that data integrity of these removable devices is not jeopardized when removed from a digital appliance.

A unit of digital storage such as a computer hard disk, a flash drive or a flash card storage device and other such devices will be referred herein as a digital media storage device, or a media device.

A media device, unlike a floppy diskette or a Compact Disc includes a controller with some RAM, and or ROM or other memory. The reason for these components became necessary as these devices became more complex, requiring managing media transparently to the appliance, for example in order to hide media defects and manage the storage media on a high level.

Due to the growing storage size of these devices, performance such as access speed has been improved for these devices by capabilities such as caching data for media device in digital appliance. This on the one hand improves performance, for example, by caching file table information of media device. This on the other hand creates a problem in cases where these devices are disconnected unexpectedly from a digital appliance. In some cases the last file or files may have not been updated because the file table has not been written back to the device. In other cases more severe problems may occur, such as corruption of the file table.

The problem of surprise removal of hardware has been known and dealt with in the industry, to some extent. For example, Microsoft Corporation has publicized information regarding surprise removal at the link: http://www.microsoft.com/whdc/system/pnppwr/hotadd/XPrem-devs.mspx where a description of both hardware and software malfunctions is described. Essentially, any kind of removable hardware can be removed from a digital appliance without warning to the system, but when storage devices are concerned the problem of loosing data or even corrupting the file table exists. Therefore in Windows XP for example, a refined caching policy for removable storage has been introduced. As a result, in Windows XP the write cache is disabled by default thereby solving many of the problems of previous versions of Windows. This does have an effect on performance. On the other hand even with this cache-disabled policy, the problems of data loss may still occur. For example, if the storage device is removed while a long file is written to the device, or just shortly before its completion. Another example of a problem that may occur is the removal of the storage device while the file table is being updated.

Due to these problems, there exists a requirement for the user of a digital appliance to manually safely remove any removable devices from the computer. In this manner, the digital appliance flushes all cache and data to the storage device and closes connection to that device, so that no further communication is made through this device. This manner is also referred to as "safely remove hardware".

While this manner of safe removal is logical and solves all problems of surprise removal mentioned above, this step of safely removing a device is cumbersome and not comfortable or intuitive to the user. Even worst, a person may make a mistake and forget to safely remove the device, perhaps due to hurrying up or due to lack of concentration. As a result, some of the files may not be written to the device and in some cases all of the device may become unusable.

There is thus a widely recognized need for an intuitive and simple way to remove removable devices from a digital appliance, and it would be highly advantageous to have such a system devoid of the above limitations.

SUMMARY OF THE INVENTION

According to one aspect of the present invention there is provided a method for allowing a user to remove a removable device connected to a digital appliance in a safe manner preserving removable device integrity, the method comprising:
  a. indicating to user when it is safe to remove said removable device from said digital appliance,
  b. keeping said removable device ready for use with said digital appliance when said removable device indicates it can be removed from said digital appliance,
  c. indicating to user when it is unsafe to remove said removable device from said digital appliance.

According to a second aspect of the present invention there is provided a method for allowing removal of a removable device connected to a digital appliance in a safe manner preserving removable device integrity, the method comprising:
  a. indicating non-busy status following a period of time said device does not receive integrity risking commands from said digital appliance,
  b. indicating to user safe to remove status when removal of said device from said digital appliance preserves device integrity,
  c. indicating busy status following said device receiving a command that risks data integrity of said device if removed from said digital appliance,
  d. indicating to user unsafe to remove status when removing said device from said digital appliance risks preservation of device integrity.

According to a third aspect of the present invention there is provided a data storage device capable of connecting to a digital appliance and being removed from said digital appliance during operation of said digital appliance, the data storage device comprising:

a. physical file storage,
b. a safe removal indication unit to indicate to user when it is safe to remove said data storage device from said digital appliance preserving said data storage device data integrity,
c. a processing unit,
whereby said processing unit checks when no access is made to said at least part of physical file storage for a specified period of time and said indication unit indicates to user it is safe to remove said data storage device from said digital appliance preserving said data storage device data integrity.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings, in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

The present invention includes several embodiments that can be realized using an autonomous digital device described herein. In this disclosure an autonomous removable digital device is described where the removable device can be removed from a digital appliance without the requirement to safely remove the device. Removable digital device can indicate to the user when it is safe to be removed from a digital appliance preserving integrity of the removable device. This indication resembles the case of floppy disk drives having a led to indicate to a user when it is safe to remove floppy disk from the floppy drive.

In the description herein below, the term "non-volatile storage" refers to storage media that remains unchanged when power is shut off. For example, flash memory and hard-drive magnetic media.

Figure 1:
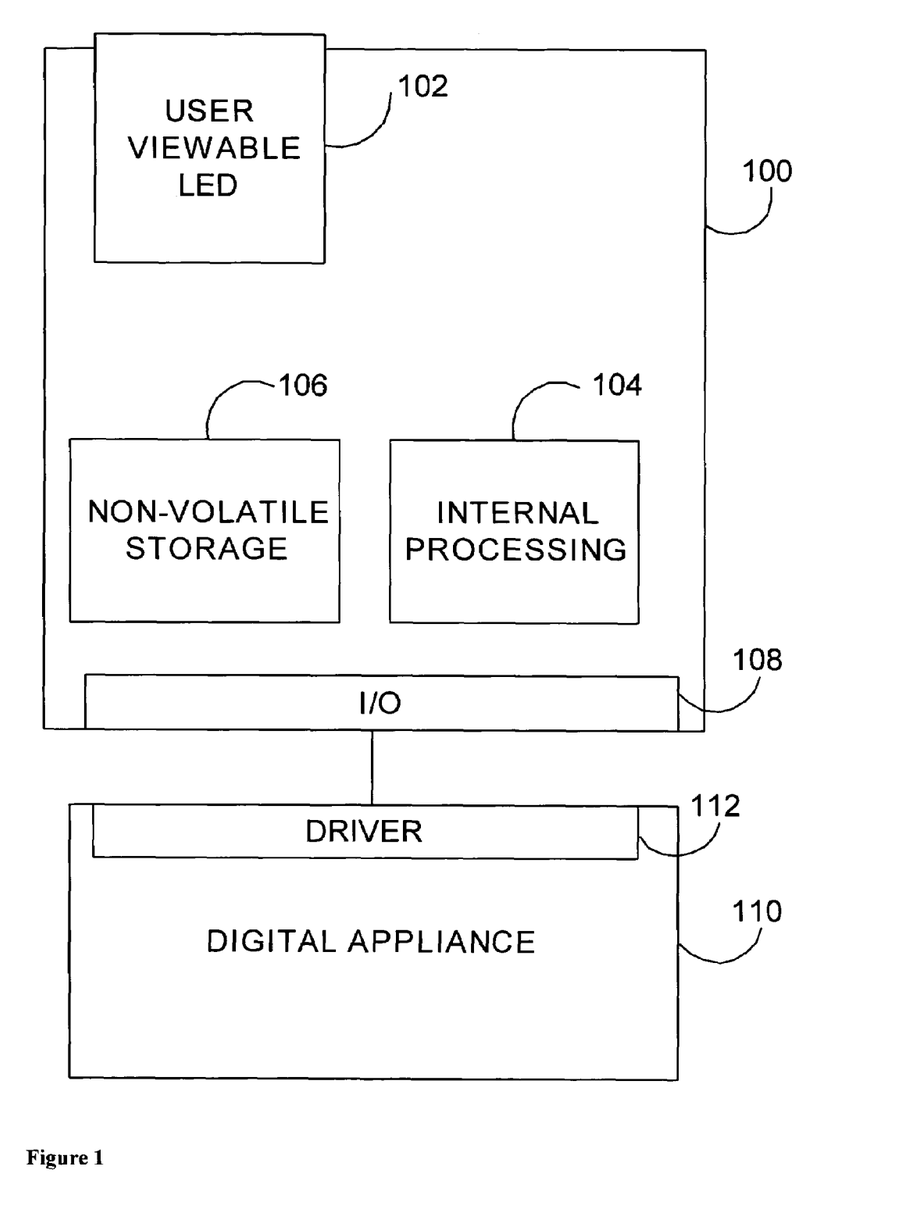
FIG. 1 is a block diagram illustration of a media device connected to a digital appliance where media device has a user-viewable busy led indicator, in accordance with an embodiment of the present invention.

Reference is now made to FIG. 1, which is a block diagram illustration of a media device connected to a digital appliance where media device has a user-viewable busy led indicator, in accordance with an embodiment of the present invention comprising a media device 100 connected to a digital appliance 110. The media device 100 includes a user-viewable busy led indicator 102, non-volatile storage 106, an internal processing module 104 and an I/O module 108. The non-volatile storage 106 may contain user data files as well as file table for user files. The digital appliance 110 includes a driver 112 that communicates with media device 100. The driver 112 receives all data requests from digital appliance 110 for device 100. User-viewable busy led indicator referred herein as led 102 indicates to the user when it is safe to remove the media device 100 from digital appliance 110, such that pulling the device 100 from appliance 110 will not cause any loss of data to the media device 100 or harm media device. Usage of led 102 for removing media device 100 from digital appliance 110 is explained in FIG. 2. Media device 100 can keep track of all requests received from digital appliance 110. Therefore media device can check if a period of time has elapsed where no requests for example to read or write have been made by digital appliance 110. Measuring a period of time may be accomplished using an internal real-time clock within media device 100 not shown in FIG. 1. Media device 100 can turn on led 102 if a request for example to read or write is received from digital appliance 110. Media device 100 can delay a certain command for example a write command for a period of time following lighting led 102. This is useful for safeguarding a minimum period of time between lighting led 102 and actual time when data loss may occur when device 100 is pulled out of appliance 110. In cases where digital appliance has a cache for at least part of storage 106, it is necessary to flush digital appliance 110 cache prior to turning off led 102. This coordination process is explained in FIG. 3A.

In some embodiments more than one led may exist. For example, one led may indicate activity such as read and write while another led may indicate a safe removal status. These are different because media device integrity may not be jeopardized while read action takes place. In some embodiments other ways of communicating the possibility to safely remove a device from a digital appliance, either by other I/O manners or through indications such as on the digital appliance.

Please note that the internal processing module 104 may include any processing power such as CPU and may have access to various types of volatile and non-volatile memory such as RAM, ROM, FLASH, EPROM, Magnetic Disk media etc, not included in the drawing for clarity. Please note that other modules may be included in the media device not included in the drawing for clarity.

In some embodiments the media device 100 may include a digital appliance such as a mobile multi-media player. The device may then connect to another digital appliance for transferring data. The invention may then apply to the player and digital appliance; the invention relates to any device that may be at any time attached or removed from a digital appliance.

Figure 2:
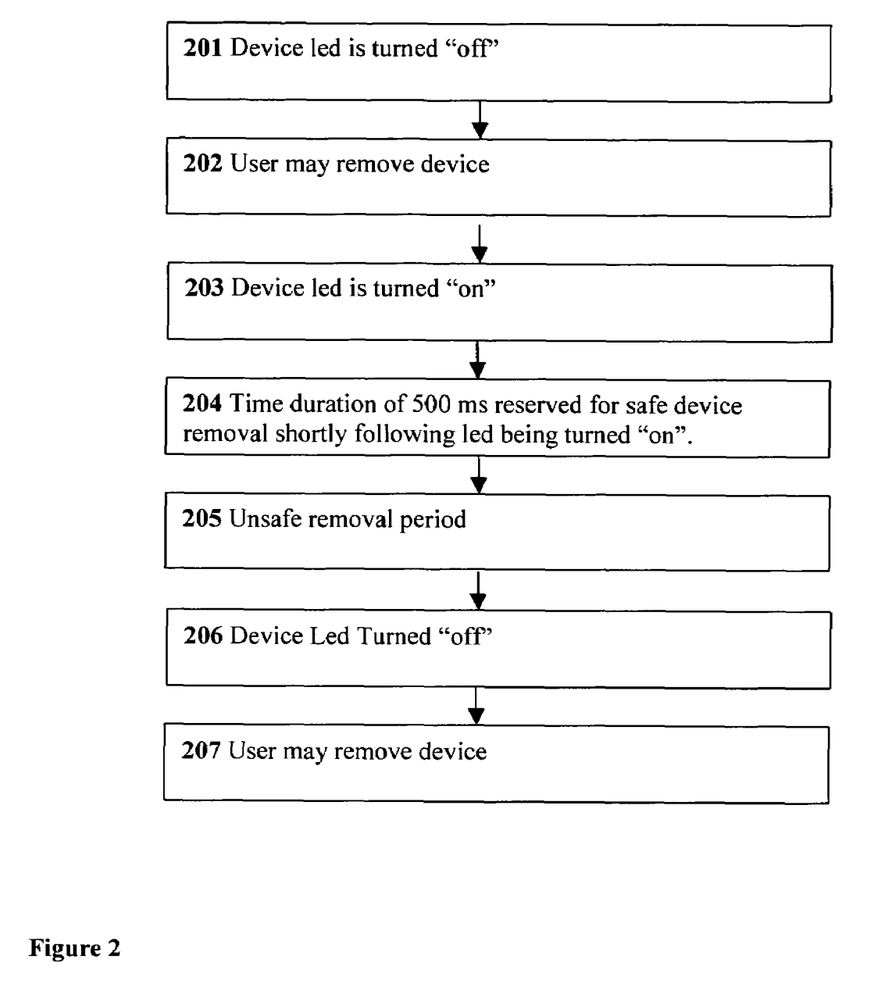
FIG. 2 is a schematic flowchart for using a viewable busy led of a media device to remove media device from a digital appliance, in accordance with an embodiment of the present invention.

Reference is now made to FIG. 2, which is a schematic flowchart for using a viewable busy led of a media device to remove media device from a digital appliance, in accordance with an embodiment of the present invention.

In step 201 device led is turned off. User viewable busy led 102 referred to herein as led 102 is turned off. This indicates to the user that device 100 may be removed from digital appliance 110 without taking any other additional step. This indication indicates that removal will not cause any data loss to data already transferred between media device 100 and digital appliance 110.

In step 202 user may remove the device 100 from digital appliance 110. At this step digital appliance 110 has access to device 100 and may use device 100 in the future. This is different to ejecting a device or removing a device, which means the device can no longer be accessible by digital appliance.

In step 203 device led is turned on. This may occur as a result of digital appliance 110 making use of the media device 100 for reading data. This may also occur due to the fact that internal integrity of the device is not stable, such as during the time of writing data files or updating file table information for example. Other reasons may exist as well. In some embodiments different actions may be taken for different types of access.

In step 204 time duration of 500 ms is reserved for safe device removal shortly following led being turned on. This time duration may be necessary in case a user attempts to pull a non-busy device, with led 102 turned off, and led turns on shortly before device is actually removed. In order to prevent data loss and inconsistencies, this time period is taken prior to making access to media device. In some embodiments a different time period than 500 ms may be used. In some embodiments no time duration may be used. In some embodiments some actions such as read may be carried out while others, such as write may delay other successive actions. In some embodiments write commands may be made to a temporary store within media device 100 and copied to designated location following time wait period. An example is presented in FIG. 4.

In step 205 unsafe removal period is entered. At this stage it is unsafe to remove the device 100 from digital appliance 110. This is indicated to the user by a lit device led 102, warning against the removal of the device. Removal of device 100 from digital appliance 110 at this stage may cause data loss or data corruption to data on device 100.

In step 206 device led is turned off. As in step 201 this indicates to the user that device 100 may be removed from digital appliance 110 without taking any other additional step.

In step 207 user may remove device 100 from digital appliance 110. At this step digital appliance 110 has access to device 100 and may use device 100 in the future. Similar to step 202, this is different to ejecting a device or removing a device, which means the device can no longer be accessible by digital appliance.

This series of steps displays how a user may remove a removable device from a digital appliance without requiring the user to take any action, such as requesting safe removal from the digital appliance, prior to removing the device. The user can intuitively tell that the device is busy using the device led and pull the device out once the led is turned "off" in a manner that is safe to the data integrity of the device and appliance. This manner closely resembles the floppy disk where the busy light of the floppy disk drive indicates the device is busy and should not be ejected.

In the description herein below, the term "I/O counter" of a media device refers to an internal counter, which incrementally counts the number of I/O requests the media device receives.

Figure 3A:
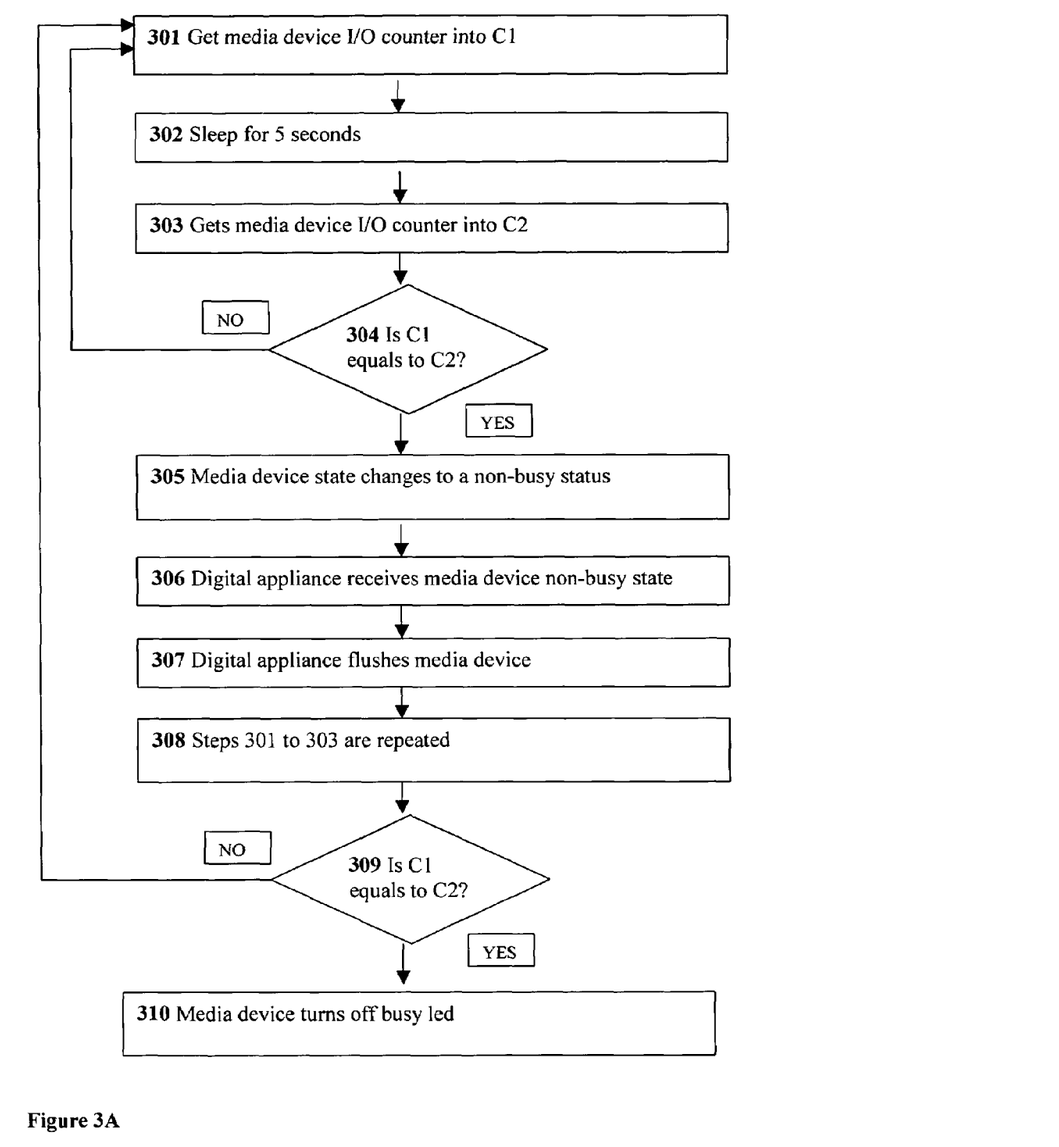
FIG. 3A is a schematic flowchart for turning "off" a user viewable busy led of a media device connected to a digital appliance, in accordance with an embodiment of the present invention.

Reference is now made to FIG. 3A, which is a schematic flowchart for turning "off" a user viewable busy led of a media device connected to a digital appliance, in accordance with an embodiment of the present invention.

In step 301 media device I/O counter is received and stored into location C1.

In step 302 a delay of 5 seconds takes place. In some embodiments other time values may be taken.

In step 303 media device I/O counter is received and stored into location C2.

In step 304 C1 is compared to C2. If C1 equals C2, it means no I/O requests have been made during the 5 seconds delay. In this case step 305 follows. Otherwise device is being used by digital appliance and step 301 is returned to.

In step 305 media device internal status changes to non-busy. This takes place after the delay period where no requests from media device had taken place.

In some embodiments steps 301 to 305 take place within media device. In some embodiments steps 301 to 305 take place in digital appliance by communicating with media device. In some embodiments, steps 303, 304 and 305 is made in a single step within media device so as not to let any I/O request come between these steps.

In some embodiments where digital appliance does not cache any data of media device, media device may turn busy led 102 off by itself and skip next steps. In some embodiments where digital appliance does cache data of media device, such as file data or file table data, steps 306 follows.

In step 306 the digital appliance receives media device non-busy state. In some embodiments this is done by digital appliance querying media device internal status.

In step 307 the digital appliance flushes media device. This action makes sure all data cached by digital appliance is written back to media device. In some embodiments the flushing of data and file table information may be implemented for example in Linux by the utility Sync. In Windows this may be done for example by a utility Sync from www.sysinternals.com. Other methods or additional methods may be implemented as well.

In step 308 steps 301 to 303 are repeated, in order to check that no data risking device integrity has been made to media device following flushing of digital appliance cache. In some embodiments C1 measurement is taken from step 301 and is not taken again.

In step 309 C1 is compared to C2. If C1 equals C2, it means no I/O requests have been made during the 5 seconds delay and that no data risking device integrity has been made during this period. In this case step 310 follows. Otherwise device is being used by digital appliance and step 301 is returned to.

In step 310 media device turns off led. This informs the user that device can be safely removed from digital appliance even though it is still usable by digital device. The removal at this time will not cause risk to integrity of the device, such as risk to data on the device, since device data has been flushed and no data communication is currently taking place with the digital appliance. In some embodiments steps 308 to 310 are made within device in one step. In some embodiments C1 measurement in step 308 is taken from step 301.

At this point, digital appliance can still use the device and this case is not similar to ejecting or removing the device from the digital appliance.

In some embodiments where media device data is not cached in digital appliance but file table information is cached by digital appliance, or in embodiments where media device data is written straight away into media device from digital appliance cache, the following check is made during step 307. The check that is made is whether data has been written to data area location of device or to file table information location of device. This check is made in order to determine if during step 307 the device has been used by digital appliance rather than only file table cached data has been written. If device has been used by digital appliance during step 307 and data has been written to data locations of media device, media device internal status may be switched to busy and busy led remains turned on. In such embodiment, C2 measurement as taken in step 308 may not change when data relating to file table data is written during flushing of step 307.

Figure 3B:
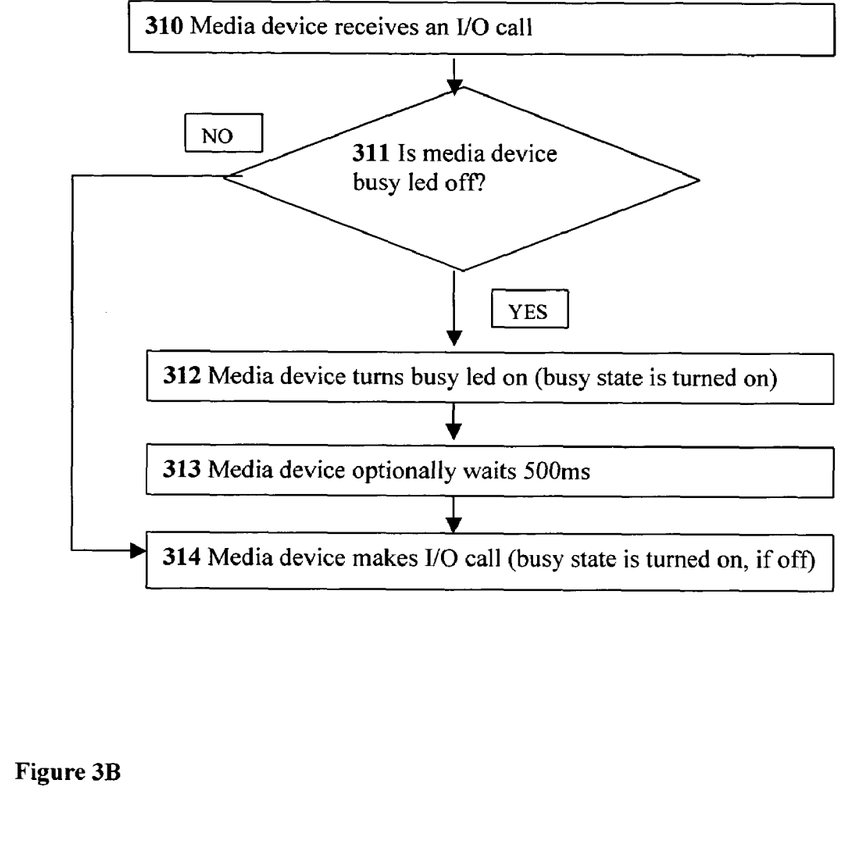
FIG. 3B is a schematic flowchart for turning "on" a user viewable busy led of a media device connected to a digital appliance, in accordance with an embodiment of the present invention.

Reference is now made to FIG. 3B, which is a schematic flowchart for turning "on" a user viewable busy led of a media device connected to a digital appliance, in accordance with an embodiment of the present invention.

In step 310 media device receives an I/O call. This call is received from digital appliance and may be a read or write call for example. This I/O call is a call that may cause a risk to the device integrity if the device is removed from digital appliance.

In step 311 a check is made, whether media device busy led is turned off. If busy led 102 is turned off, step 312 follows. If busy led 102 is turned on, step 314 follows.

In step 312 media device turns busy led on. Internal busy state of media device, mentioned in FIG. 3A, is turned on as well. The led being turned on indicates to the user that media device is currently in use and should not be removed.

In step 313 media device optionally waits 500 ms. This time window is reserved for protecting a device in case the user reaches to disconnect the device, which initiates data communication shortly prior to user disconnecting the device, as mentioned in step 204. In some embodiments a different time period may be taken. In some embodiments a device is used during this short time period in a manner that ensures integrity of device data if removed, as explained in FIG. 4.

In step 314 media device makes I/O call. In this step busy state flag as mentioned in FIG. 3A is turned on if it is off.

This series of steps of FIGS. 3A and 3B displays how a media device can operate in accordance with a user viewable led in order to allow a user an intuitive way to determine when it is safe to disconnect the media device from a digital appliance. Media device led can be used to notify the user when it is possible to remove a removable device from a digital appliance without requiring the user to take any action prior to removing the device. The user can intuitively tell that the device is busy using the device led and pull the device out once the led is turned "off" in a manner that is safe to the data integrity of the device. This manner closely resembles the floppy disk where the busy light of the floppy disk drive indicates that the device is busy and should not be ejected.

In the description herein below, the term "safe removal time window" or "safe time window" refers to a reserved time period following media device led 102 being turned "on" in order to safeguard media device removal immediately following led being switched on. This period occurs in step 204 of FIG. 2 and in step 313 of FIG. 3. This time should be relatively short, usually under 1 second, but long enough for a user to notice the led has been turned on and refrain from removing the device.

Figure 4:
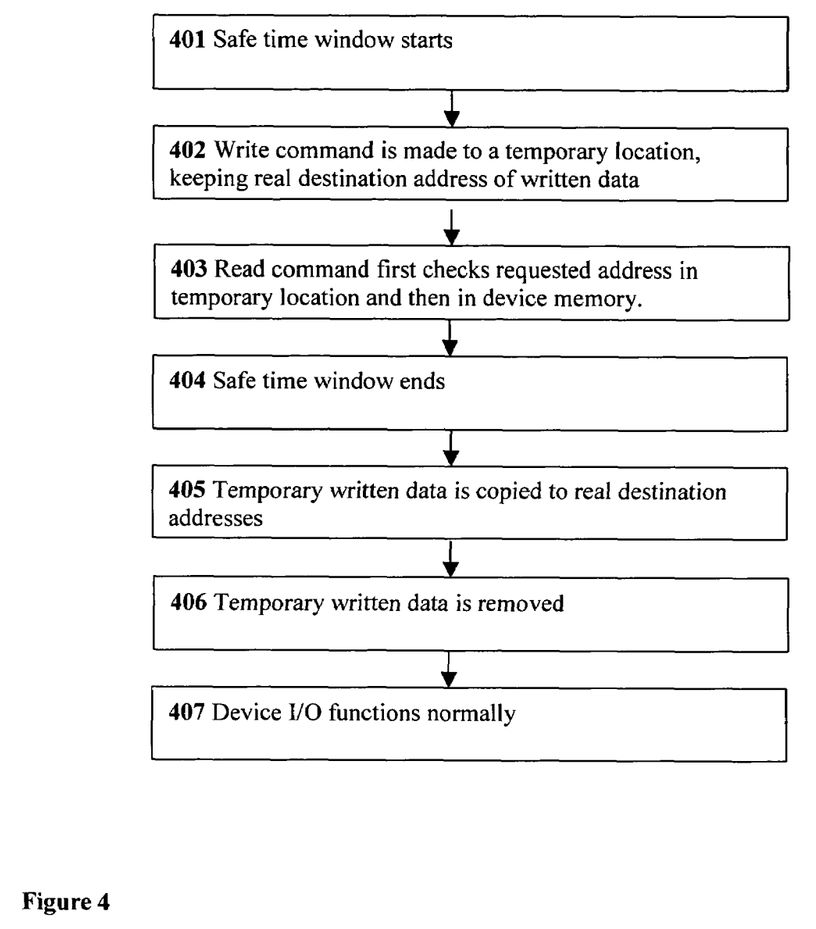
FIG. 4 is a schematic flowchart for allowing a digital appliance to access connected media device during a safe removal time window period, in accordance with an embodiment of the present invention.

Reference is now made to FIG. 4, which is a schematic flowchart for allowing a digital appliance to access connected media device during a safe removal time window period, in accordance with an embodiment of the present invention;

In step 401 safe time window starts. This occurs immediately following media device led being switched on, such as in step 204 of FIG. 2.

In step 402 a write command is being received during safe time window. Write data is made to a temporary location, while destination address of data command is kept. If several write commands to the same destination address occur, the last one is kept.

In step 403 a read command is being received during safe time window. Read command data address is first checked against data addresses in temporary location for written data of step 402. If requested address is not found there, data is read from device memory.

In step 404 safe time window ends.

In step 405 temporary written data is copied to real destination addresses. This is possible because of the keeping of real destination addresses in step 402.

In step 406 temporary written data is removed.

In step 407 device I/O returns to function normally.

This series of steps of FIG. 4 displays how access of a digital appliance to a media device connected to it can be made even during reserved time duration for safely removing the media device from the digital appliance. In FIG. 4, digital appliance access of media device is made while keeping device integrity previous to the operations taking place during safe time window.

It may be appreciated by those skilled in the art of the present invention that the following advantages exist in this invention, over the existing mechanisms:

(a) With this invention, there is no need to manually request safe removal of a removable device from a digital appliance, once removable device is not in use.

(b) With this invention, if a user pulls out a removable device from a digital appliance while the device is not in use, there is no risk to the content of the device.

(c) With this invention, the removal of a removable device from a digital appliance becomes intuitive, and there is no requirement to learn how to use the removable device. This case resembles the removal of floppy disks from a floppy drive.

(d) With this invention there is no risk to media device data if a removable device is removed from a digital appliance soon after it was safe to remove the media device from the digital appliance.

(e) With this invention digital appliance can access a connected media device even during a time frame when it is still safe to remove the device from digital appliance. This time frame may start following digital appliance continued use of media device.

CONCLUSION, RAMIFICATIONS AND SCOPE

Accordingly, the reader will see that the closure of this invention provides a safe and intuitive method to remove a removable device from a digital appliance without requiring the user to manually request device removal from digital appliance. This invention presents a manner in which the user can intuitively tell when a removable device is not in use by digital appliance and remove the device without jeopardizing data integrity of the data on the removable device.

Furthermore with this invention there are additional advantages in that:

(a) The user can tell when it is safe to remove a removable device from a digital appliance in an intuitive manner such as a visible led, much like a floppy disk is removed from a digital appliance. This makes it unnecessary to manually request the removal of a removable device from a digital appliance. This makes the use of removable devices simple and intuitive and protects data integrity of these devices.

(b) A time window may be applied from the time the removable device indicator is turned on, until changes that may risk data integrity are actually being made on the device. If a user removes the device during this time window, the device will still be safely removed from the digital appliance so that data integrity is kept.

(c) A user forgetting to safely remove the device from a digital appliance may cause data loss to the removable device. With this invention data is safely stored on the removable device following the completion of digital appliance operations.

(d) A removable device may be removed from a digital appliance even if digital appliance begins accessing removable device shortly prior to user removal of device. Data integrity is kept even though digital appliance accessed removable device when it was still connected.

Although the description above contains many specifications, these should not be constructed as limiting the scope of the invention but as merely providing illustrations of some exemplary embodiments of this invention.

For example, a different manner to communicate the busy/non-busy state of the removable device may be used to a single led; more than a single means may be used to communicate status of operation; for example, busy for reading, which does not jeopardize the removable device, and busy writing which may jeopardize the device. In addition to a led or as an alternative, indication of removal safety may appear on digital appliance. A time window for the safety time between busy declarations and actual usage may or may not be not be implemented. A time window for write operations in device may be implemented but not for read operations for example; the manner in which data is managed during safe time window may be done in different manners to that explained in FIG. 4. The removable device may be a storage device or any other device that may be connected and removed from a digital appliance. The removable device may be a complex device, for example a digital multimedia player including storage media as well as media playing capabilities, or a device including storage and/or removable storage such as a digital camera. Other means than steps of FIG. 2 may be used for communicating to the user the safety to remove a removable device from a digital appliance; this may include some display on the digital appliance for example. This invention may be incorporated with other additional means and extensions, for example, a specific digital appliance driver may be written specifically for the implementation of this invention or in addition to other applications. The digital appliance may include caching of some data and file table data belonging to removable device. The digital appliance may not cache any data of removable device. In the figures of this invention an explanation regarding data loss is discussed, and busy led is related to data integrity. In other embodiments busy led could have other meanings of safety, such as electrical characteristic safety, printing completion safety, device can safely be removed without jeopardizing it electronically and so forth.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for allowing a user to remove a removable device connected to a digital appliance in a safe manner preserving removable device integrity, the method comprising:

a. indicating to user when it is safe to remove connected said removable device from said digital appliance without requiring user action prior to said safe to remove indication when removal of said connected device preserves said device data integrity said safe to remove indication taking place following cache of said digital appliance for at least part of said removable device is flushed, b. keeping said removable device ready for use with said digital appliance following said safe to remove indication said safe to remove indication taking place following said cache of said digital appliance for at least part of said removable device is flushed thereby removable device is ready for use with said digital appliance following said cache of said digital appliance for at least part of said removable device is flushed, c. indicating to user when it is unsafe to remove connected said removable device from said digital appliance following said cache of said digital appliance for at least part of said removable device is flushed and following said removable device receiving at least one integrity risking command from said digital appliance.

2. A method according to claim 1 wherein a safe removal time window is reserved following appearance of said unsafe removal indication to user whereby removal of said removable device from said digital appliance following said unsafe removal indication preserves said removable device data integrity during said reserved time window.

3. A method according to claim 2 wherein said digital appliance can access said removable device during said reserved time window for safe removal.

4. A method according to claim 1 wherein said removable device is a removable storage device.

5. A method according to claim 1 wherein a safe removal time window is reserved following appearance of said unsafe removal indication to user and before allowing received said command risking device data integrity to access said removable device in a manner that risks said removable device data integrity whereby removal of said removable device from said digital appliance following said unsafe removal indication preserves said removable device data integrity during said reserved time window.

6. A method according to claim 2 wherein said removable device is a removable storage device.

7. A method for allowing removal of a removable device connected to a digital appliance in a safe manner preserving removable device integrity, the method comprising:
   a. indicating to user safe to remove status for removal of connected said device from said digital appliance in a safe manner without requiring user action prior to said safe removal indication and without requiring user action prior to removing connected said device in a safe manner said safe to remove status follows flushing of cache of said digital appliance for at least part of connected said device when removal of said device from said digital appliance preserves said device integrity keeping connected said device ready for use by said digital appliance,
   b. indicating busy status of connected said device following said flushing of said cache and following said device receiving a command that risks data integrity of said device if removed from said digital appliance said device waits during a reserved safe removal time window before allowing said command risking device data integrity that follow said safe to remove status to risk said device integrity whereby connected said device may be removed from said digital appliance preserving said device data integrity when said busy status is indicated following receiving said command risking data integrity during said reserved safe removal time window said device kept ready for use by said digital appliance,
   c. indicating to user unsafe to remove status of connected said device following said flushing of said cache and following duration of said reserved safe removal time window when removing connected said device from said digital appliance risks preservation of device integrity said device kept ready for use by said digital appliance.

8. A method according to claim 7 wherein said device is a storage device.

9. A method according to claim 7 wherein said digital appliance can access said removable device during said reserved time window for safe removal.

10. A method according to claim 7 wherein said busy status indication of said device and said unsafe to remove status indication of said device are combined as a single indication of said device.

11. A data storage device capable of connecting to a digital appliance and being removed from said digital appliance during operation of said digital appliance, the data storage device comprising:
   a. a physical file storage,
   b. a safe removal indication unit to indicate to user when it is safe to remove said data storage device from said digital appliance preserving said data storage device data integrity, whereby said digital appliance flushes data cache for at least part of said connected data storage device to said data storage device prior to indicating safe removal using said safe removal indication unit without requiring user action prior to said safe removal indication for allowing removal of connected said data storage device from said digital appliance in a manner that preserves said data storage device data integrity keeping connected said data storage device ready for use by said digital appliance following said flushing of said digital appliance cache and following said safe removal indication.

12. The data storage device of claim 11 wherein said digital appliance flushes cached data of said data storage device following specified period of time no access is made to said physical file storage by said digital appliance and prior to indicating safe removal to user by said indication unit thereby allowing the removal of said data storage device from said digital appliance without requiring user action prior to removing connected said data storage device in a manner that does not risk said storage device data integrity.

13. The data storage device of claim 11 wherein a safe removal time window period of time is reserved following indication unit indicates it is unsafe to remove said data storage device from said digital appliance whereby removal of said data storage device following said unsafe removal indication and during said reserved safe removal time window does not risk said storage device data integrity.

14. The data storage device of claim 13 wherein said digital appliance can access said data storage device during said reserved time window for safe removal.

* * * * *